United States Patent
Scott et al.

(10) Patent No.: US 9,849,543 B2
(45) Date of Patent: Dec. 26, 2017

(54) ADDITIVE MANUFACTURING APPARATUS WITH A CHAMBER AND A REMOVABLY-MOUNTABLE OPTICAL MODULE; METHOD OF PREPARING A LASER PROCESSING APPARATUS WITH SUCH REMOVABLY-MOUNTABLE OPTICAL MODULE

(71) Applicant: RENISHAW PLC, Wotton-Under-Edge (GB)

(72) Inventors: Simon Peter Scott, Newcastle-Under-Lyme (GB); Chris Sutcliffe, Liverpool (GB)

(73) Assignee: RENISHAW PLC, Wotton-Under-Edge (GB)

( * ) Notice: Subject to any disclaimer, the term of this patent is extended or adjusted under 35 U.S.C. 154(b) by 89 days.

(21) Appl. No.: 14/832,395

(22) Filed: Aug. 21, 2015

(65) Prior Publication Data

US 2015/0352668 A1  Dec. 10, 2015

Related U.S. Application Data

(63) Continuation of application No. 13/125,554, filed as application No. PCT/GB2009/002147 on Sep. 7, 2009, now Pat. No. 9,114,478.

(30) Foreign Application Priority Data

Sep. 5, 2008 (GB) .................................. 0816308.1

(51) Int. Cl.
*B23K 26/04* (2014.01)
*B23K 26/046* (2014.01)
(Continued)

(52) U.S. Cl.
CPC ............ *B23K 26/046* (2013.01); *B23K 26/04* (2013.01); *B23K 26/082* (2015.10); *B23K 26/12* (2013.01);
(Continued)

(58) Field of Classification Search
CPC ........ B33Y 30/00; B33Y 40/00; B23K 26/34; B23K 26/127; B23K 26/12; B23K 26/04; B23K 26/046; B29C 67/0085
See application file for complete search history.

(56) References Cited

U.S. PATENT DOCUMENTS

| | | | | |
|---|---|---|---|---|
| 4,838,631 A | * | 6/1989 | Chande | ................ B23K 26/067 219/121.75 |
| 4,997,250 A | * | 3/1991 | Ortiz, Jr. | ................ B23K 26/06 219/121.75 |

(Continued)

FOREIGN PATENT DOCUMENTS

| BY | 007448 B1 | 10/2006 |
|---|---|---|
| DE | 4112695 A1 | 7/1992 |

(Continued)

OTHER PUBLICATIONS

Fabrice Bardin, Adolfo Cobo, Jose Lopez-Higuera, Olivier Collin, Ascal Aubry, Thierry Dubois, Mats Hogstrom, Per Nylen, Peter Jonsson, Julian D.C. Jones, and Duncan P. Hand—2006 Optical Society of America—Optical Techniques for Real-Time Penetration Monitoring for Laser Welding.*The year of publication is sufficiently earlier than the effective US filed and any foreign priority date so that the particular month of publication is not at issue.*

(Continued)

*Primary Examiner* — Geoffrey S Evans
(74) *Attorney, Agent, or Firm* — Oliff PLC (57) ABSTRACT

An additive manufacturing apparatus comprises a processing chamber (100) defining a window (110) for receiving a
(Continued)

laser beam and an optical module (10) The optical module is removably-mountable to the processing chamber for delivering the laser beam through the window. The optical module contains optical components for focusing and steering the laser beam and a controlled atmosphere can be maintained within the module.

8 Claims, 5 Drawing Sheets

(51) Int. Cl.
  *B33Y 30/00* (2015.01)
  *B23K 26/12* (2014.01)
  *B23K 26/34* (2014.01)
  *B29C 67/00* (2017.01)
  *B23K 35/02* (2006.01)
  *B23K 26/70* (2014.01)
  *B23K 26/082* (2014.01)
  *B22F 3/105* (2006.01)

(52) U.S. Cl.
  CPC .......... *B23K 26/127* (2013.01); *B23K 26/34* (2013.01); *B23K 26/703* (2015.10); *B23K 35/0244* (2013.01); *B29C 67/0085* (2013.01); *B33Y 30/00* (2014.12); *B22F 2003/1056* (2013.01); *B22F 2998/00* (2013.01); *Y02P 10/295* (2015.11)

(56) References Cited

U.S. PATENT DOCUMENTS

| | | |
|---|---|---|
| 5,231,261 A | 7/1993 | Duthoo |
| 5,267,013 A | 11/1993 | Spence |
| 5,508,489 A * | 4/1996 | Benda .......... B22F 3/1055 219/121.76 |
| 5,536,467 A | 7/1996 | Reichle et al. |
| 5,846,370 A * | 12/1998 | O'Connor .......... B29C 67/0077 156/272.8 |
| 5,985,204 A * | 11/1999 | Otsuka .......... B29C 67/0077 264/219 |
| 6,122,564 A | 9/2000 | Koch et al. |
| 6,384,370 B1 | 5/2002 | Tsunemi et al. |
| 6,459,951 B1 | 10/2002 | Griffith et al. |
| 6,492,651 B2 | 12/2002 | Kerekes |
| 6,624,386 B2 | 9/2003 | Von Borstel |
| 6,767,499 B1 | 7/2004 | Hory |
| 6,791,057 B1 | 9/2004 | Kratzsch et al. |
| 6,815,636 B2 | 11/2004 | Chung et al. |
| 7,168,935 B1 | 1/2007 | Taminger et al. |
| 7,419,632 B2 | 9/2008 | Keller |
| 7,515,986 B2 | 4/2009 | Huskamp |
| 7,537,722 B2 | 5/2009 | Andersson et al. |
| 7,714,250 B2 | 5/2010 | Borgoltz et al. |
| 7,863,544 B2 | 1/2011 | Serruys et al. |
| 2001/0014403 A1 | 8/2001 | Brown et al. |
| 2002/0090313 A1 | 7/2002 | Wang et al. |
| 2003/0052105 A1* | 3/2003 | Nagano .......... B23K 26/0604 219/121.83 |
| 2004/0173946 A1 | 9/2004 | Pfeifer |
| 2005/0002434 A1* | 1/2005 | Armier ............ G02B 7/1815 372/99 |
| 2005/0107773 A1 | 5/2005 | Bergt et al. |
| 2005/0252895 A1 | 11/2005 | Schuermann et al. |
| 2005/0263934 A1 | 12/2005 | Chung et al. |
| 2006/0118532 A1* | 6/2006 | Chung .......... B22F 3/1028 219/121.85 |
| 2007/0145629 A1 | 6/2007 | Ebert |
| 2007/0176312 A1 | 8/2007 | Clark et al. |
| 2007/0183918 A1* | 8/2007 | Monsheimer ....... B29C 67/0077 419/1 |
| 2008/0151341 A1 | 6/2008 | Perret |
| 2009/0097511 A1* | 4/2009 | Mohrdiek ............... H01S 5/146 372/21 |
| 2009/0152771 A1 | 6/2009 | Philippi |
| 2009/0206065 A1 | 8/2009 | Kruth et al. |
| 2009/0206522 A1 | 8/2009 | Hein |
| 2011/0039016 A1 | 2/2011 | Beard |
| 2011/0121492 A1 | 5/2011 | Philippi et al. |
| 2013/0112672 A1 | 5/2013 | Keremes |
| 2013/0168902 A1 | 7/2013 | Herzog et al. |

FOREIGN PATENT DOCUMENTS

| | | |
|---|---|---|
| DE | 19953000 A1 | 5/2001 |
| DE | 10236907 A1 | 2/2004 |
| DE | 102004057865 A1 | 6/2006 |
| DE | 102005014483 A1 | 10/2006 |
| DE | WO2012097799 A2 | 7/2012 |
| DE | WO2012100766 A1 | 8/2012 |
| DE | WO2013029581 A1 | 3/2013 |
| DE | WO2013037346 A1 | 3/2013 |
| EA | 007448 B1 | 10/2006 |
| EP | 2147738 A1 | 1/2010 |
| FR | 2147738 A1 | 1/2010 |
| GB | 2342609 A | 4/2000 |
| JP | 6273682 A | 9/1994 |
| JP | 2002144437 A | 5/2002 |
| JP | 2003015071 A | 1/2003 |
| JP | 2004195491 A | 7/2004 |
| JP | 2005024835 A | 1/2005 |
| JP | 2006078903 A | 3/2006 |
| JP | 2008015003 A | 1/2008 |
| JP | 2009006509 A | 1/2009 |
| SE | WO2013098054 A1 | 7/2013 |
| WO | 2012097799 A2 | 7/2012 |
| WO | 2012100766 A1 | 8/2012 |
| WO | 2013029581 A1 | 3/2013 |
| WO | 2013037346 A1 | 3/2013 |

OTHER PUBLICATIONS

Guijun Bi, Bert Schurmann, Andres Gasser, Konrad Wissenbach, Reinhart Poprawe—International Journal of Machine Tools & Manufacture—2007*—"Development and Qualification of a Novel Laser-Cladding Head With Intergrated Sensors" The year of publication is sufficiently earlier than the effective US filed and any foreign priority date so that the particular month of publication is not at issue.*

Dongming Hu, Radovan Kovacevic—International Journal of Medicine Tools & Manufacture—2003*"Sensing Modeling and Control for Laser-Based Additive Macnufacturing" The year of publication is sufficiently earlier than the effective US filing date and any foreign priority date so that the particular month of publication is not at issue.*

Peter Abels, Stefan Kaierle, Christian Kratzsch, Reinhart Poprawe and Wolfgang Schultz—Conference Paper for U.S. Proceedings—1999*"Universal Coaxial Process Control System for Laser Materials Processing" *The year of publication is sufficiently earlier than the effective US filing date and any foreign priority date so that the particular month of publication is not at issue.*

May 9, 2014 Office Action issued by European Patent Office in Application No. 09 785 069.7-1702.

Nicolaj C. Stache, Henrik Zimmer, Jens Gedicke, Boris Regaard, Alexander Olowinsky, Achim Knepper, and Til Aach—"Approaches for High-Speed Melt Pool Detection in Laser Welding Applications"—Europe—Nov. 22-24, 2006.

S. Kaierie, P. Abels, C. Kratzsch—"Porcess Monitoring and Control for Laser Materials Processing"—Germany—Jun. 2005.

EP 2342042, Office Action dated Apr. 30, 2013 (5 pages).

GB, Patent Office Search Report, GB0816308.1, dated Jan. 22, 2009.

Weslake, Daniel; Canadian Requisition by the Examiner; 11 pages; CA Application No. 2,738,619; dated Aug. 23, 2016.

IB, International Search Report, PCT/GB2009/002147.

GB, Patent Office Search Report, GB0816308.1, Jan. 22, 2009.

* cited by examiner

ADDITIVE MANUFACTURING APPARATUS WITH A CHAMBER AND A REMOVABLY-MOUNTABLE OPTICAL MODULE; METHOD OF PREPARING A LASER PROCESSING APPARATUS WITH SUCH REMOVABLY-MOUNTABLE OPTICAL MODULE

The invention relates to an additive manufacturing apparatus having an optical module for delivering a laser beam to the apparatus for use in a manufacturing process.

BACKGROUND

A number of different processes use laser light for manufacturing components. Manufacturing processes using laser beams includes selective laser sintering (SLS) and selective laser melting (SLM) apparatus and also methods of building components by curing of polymers such as laser lithography, for example stereolithography (SLA). Such processes can be generically described by such terms as additive manufacturing, rapid manufacturing or rapid prototyping.

In a typical SLS or SLM process, a thin layer of powder is deposited over a build area or powder bed within a SLS or SLM apparatus. A focused laser beam is scanned across portions of the powder layer that correspond to a cross-section of the three-dimensional article being constructed such that the powder at the points where the laser scans is consolidated either by sintering or by fusion. The cross-section is typically generated from a 3-D description of the component generated by scanning an original component or from computer-aided design (CAD) data.

After consolidation of a layer, the build surface is lowered by the thickness of the newly consolidated layer and a further layer of powder is spread over the surface. Again, the surface is irradiated with a laser beam in portions of the layer that correspond to a cross-section of the three-dimensional article, the newly consolidated layer being joined to the initial consolidated layer. This process is repeated until the component is completed.

In order to manufacture components according to, for example, an SLS or SLM process, a laser beam must be supplied to a work surface within the apparatus and controlled with a high degree of accuracy. The optics allowing control of the laser beam for manufacturing purposes include focusing optics, scanners and other lenses, and are extremely sensitive. Typically, the sensitive optics are built into the chassis of the manufacturing apparatus and must be set up on site by a skilled technician. Furthermore, service and repair of the optics requires downtime of the machine and can be difficult to achieve on-site, which is typically a dusty environment and non-conducive to optical repairs.

SUMMARY OF THE INVENTION

The invention provides an additive manufacturing apparatus, a system for producing components, a method of preparing a laser processing apparatus and an optical module as defined in the appended independent claims to which reference should now be made. Preferred or advantageous features of the invention are defined in dependent sub-claims.

Accordingly, in a first aspect the invention may provide an additive manufacturing apparatus comprising a processing chamber having a window for receiving a laser beam into the processing chamber, and a removably mountable optical module for delivering the laser beam through the window of the processing chamber. The module comprises a sealable housing, for example a hermetically sealable housing containing optical components for focusing and steering the laser beam. The housing is adapted to be removably mountable to the manufacturing apparatus such that the delivered laser beam can be used in a manufacturing process within the manufacturing apparatus.

The use of a removably mountable module containing the sensitive optical components for controlling the laser beam allows the module to be prepared in a clean area so that precise set-up and alignment of optical components can be carried out. A technician can access the components in these clean conditions, for example a room having a controlled atmosphere with the module arranged at a suitable height for access to the components. The technician may also have access to testing apparatus allowing the parameters of the optical module, for instance alignment and beam profile and focus to be tested comprehensively and certified or validated off-site.

Processes that involve use of powder, particularly sub-micron powder, produce an environment that is highly dusty, and dust such as sub-micron metallic powder can infiltrate machines and may cause deterioration in performance of machine components. A hermetically sealable housing allows the optical module to have a controlled atmosphere, for example a dust and humidity free air atmosphere as found in a typical clean room, even when the module is operational on-site in a factory. The ability to exclude dust and humidity from the module may improve performance and increase time periods between routine servicing.

Preferably the optical components include a focusing element, a scanning head, and an f-theta lens. A focusing element may include a number of lenses for focusing an incoming laser beam to a precise point at a work surface. The scanning head may be any suitable head for moving the laser beam for use in the manufacturing process, for example galvanometer scanning mirrors. An f-theta lens enables a focussed spot to be delivered to a planar surface within the machine. This is particularly important in additive manufacturing processes such as SLS or SLM where a focussed spot must be provided to all parts of a build surface within the processing chamber.

As an alternative to the use of an f-theta lens, the optical module may include movable optical elements that allow dynamic focusing to deliver a focussed spot to the build surface within the additive manufacturing apparatus. An example of this set up is found in the 3D-scanning system used in some SLS and SLM machines, where dynamic focussing continually changes the focus of the laser dependent on the position of the beam within the chamber so that the resultant laser spot is always in focus at the build surface.

Advantageously the optical module may include further components. For example the optical components may include one or more from the following; a beam expander, an optical isolator, a collimator, and an aperture.

The module of the apparatus may advantageously contain one or more components for monitoring parameters within the module or parameters of a processing operation. For example, the module housing may contain a beam monitor or a beam profilometer to monitor, optionally continuously, beam parameters such as power and intensity distribution and beam shape. A thermometer or thermometers may monitor temperature within the module, or temperature of individual components within the module to determine whether they are operating within optimum thermal ranges. A humidity sensor may monitor the moisture levels of the atmosphere within the module.

A camera may be positioned to monitor and preferably transmit images of the work surface. Advantageously, any camera may be a thermal imaging camera, such as a through-the-lens thermal imaging camera, that can record thermal conditions at the work-piece or work surface.

A camera may be mounted within the optical module by any known method. For example, a camera may be mounted in the optical train to allow through-the-lens inspection of the build surface. Such a camera may be included in the optical train by means of a 45 degree mirror that allows some light to pass through to the camera.

Alternatively, a camera may be mounted off-axis and view the build surface through windows in the floor of the module and the wall of the processing chamber. One disadvantage of through-the-lens inspection in systems that include an f-theta lens is that there is a certain degree of distortion. Furthermore, the viewing angle may be restricted. These problems can be overcome by the use of a camera that views the build surface through windows that are off the optic axis.

The use of a high powered laser beam may result in excessive heating of one or more components within the module. Therefore cooling means may be provided to cool the module, or cool one or more individual components within the module. Advantageously, this can be achieved by water or gas cooling pipes or channels that pass through the module to remove heat. For example, water could be piped into the module through appropriate cooling channels, for example through copper pipes, to remove heat from the desired region of the module or from the entire module. Preferably, cooling means such as cooling channels are incorporated into the floor of the optical module.

It may be advantageous for the optical module to be mounted to the processing chamber such that there is an insulation gap between the floor of the module and the wall of the chamber. Such a gap prevents heat from the chamber from heating the module and potentially interfering with the operation of the module. Alternatively a thermal insulation layer may be disposed between the floor of the module and the wall of the chamber, or incorporated within the floor of the module.

Heating means could be provided to the module should one or more component within the module need to be heated.

It is preferable that the atmosphere within the module is dehumidified air. This atmosphere can be provided by aligning the various optical elements within a clean room and then sealing the module such that the atmosphere within the module is the same as the atmosphere within the clean room.

Optionally, the module may be adapted to enable an inert atmosphere to be provided within the module. For example, the module housing could define a valve that allows the air within the module to be pumped out and replaced by an inert gas, for example, argon or nitrogen. Preferably, the inert gas could be helium, as helium has excellent thermal transfer properties and may help maintain the components within the module at a constant temperature. To further aid the temperature control within the module any gas supplied to the module may be heated or cooled as required.

The housing of the module may contain a laser source for generating a laser beam for use in a manufacturing process. Such a laser source could be mounted such that a beam is directly provided to the optical components.

Preferably, the module is provided with a means for coupling to an external laser source, for example an interface for a fibre-optic cable, the fibre-optic cable carrying the laser beam from a suitable laser source.

The optical module may comprise two or more optical trains (the arrangement of optical components within the module that the laser light passes through). Thus, the module may be able to deliver two or more laser beams into the processing chamber simultaneously. The separate optical trains may have an identical set-up, to allow for the delivery of multiple identical beams to the processing chamber. Alternatively they may have a different set up. An advantage of using different trains with different set ups is that the laser source may be capable of being switched, for example to a laser of different wavelength, without the need to change modules. Alternatively, the laser beam may be switched between trains for different parts of the process. One optical train may, for example, be set up to deliver a wide spot size to the build surface and another within the same module may be set up to produce a small spot size at the build surface.

Advantageously, the module may comprise an identification tag that provides information relating to the module, for example details of the precise set-up and the optical components and peripherals contained within the housing. It may be advantageous that details of the optical components, for example lens coatings, are easily accessible so that the module is only used with specific lasers and at specific power ranges. An optical module that is set up to deliver a laser beam of a specific wavelength, for example 1064 nanometers, and a specific power, for example 50 watts, may not be suitable for use with a laser source of different power or wavelength. Preferably, any identification tag is able to communicate to a central control computer, for example by wireless connection or by radio frequency, such that control software can check that the correct optical set-up is provided for a particular processing operation.

Preferably, the optical components are mounted within the housing on a rigid rail. This has the advantages that the components can be moved along a linear path for optimum positioning and fine-tuning of the set-up. Positioning of optical components could be done without a rail, but may require more work from a technician to set up properly. Preferably, the rail on which the optical components are mounted is itself mounted on a rigid reference plate. The rail may be adjustably mounted to the rigid reference plate such that the spacing between the rail and the reference plate can be adjusted to adjust the fixed height of the optical components above a work piece when the module is in position on a manufacturing apparatus.

Preferably both an external surface of the processing chamber of the apparatus and a portion of the housing of the module are adapted so that the module can be securely mounted to the apparatus in the appropriate position. One such mounting means would be mating plates on both the processing chamber and the optical module and bolts for securely mounting the module in the correct position.

In a typical laser manufacturing apparatus the optical components are built into the chassis of the apparatus. Where an f-theta lens is used this usually projects into the processing chamber. A cover slip is typically used to protect the f-theta lens from contamination by dust and soot. One limitation of this arrangement is that it is difficult to seal the processing chamber to operate at a vacuum pressure or a low pressure as, for example, the cover slip protecting an f-theta lens would not be able to withstand low pressures and would break. With the arrangement as claimed in this aspect of the invention, the optical module contains optical elements such as any f-theta lens and delivers a laser beam through a window into the processing chamber. This window may be sealed with a suitable material such that the processing chamber can withstand low pressures for example pressures of 1×10⁻⁴ Torr or less. The ability to lower the pressure within the processing chamber may provide a number of advantages during the processing. In the manufacture of components from metals in particular a low pressure or partial vacuum pressure may substantially improve the properties of a component. This improvement in properties may be achieved by a reduction in oxygen and oxide content within the produced component or may be due to improved microstructures as a result of different cooling rates caused by laser processing in a low pressure atmosphere.

Advantageously, the use of a separate optical module may allow the apparatus to operate under conditions where the processing chamber is at a pressure lower than atmospheric pressure and the optical train is housed at a pressure that is greater than atmospheric pressure.

The window into the processing chamber may simply be an opening that allows the laser beam from the module to be projected onto the build surface. The opening is sealed to the external environment when the module is mounted to the chamber. Preferably however, the window of the processing chamber is sealed with an optically transparent material of at least 15 mm thickness. By optically transparent it is meant a material that allows laser light of the selected wavelength for processing to pass through the material. Suitable window materials may include silicon dioxide or quartz windows (for example windows made from Suprasil®). Preferably the optically transparent material is suitably coated with anti-reflection coating as appropriate for the selected wavelength of laser light. Preferably the optically transparent material is attachable to the processing chamber such that it seals the window and enables a vacuum pressure to be formed within the processing chamber. Particularly preferably the optically transparent material is able to be swiftly changed if, for example, it becomes dirty due to dust and soot generated by the processing operation.

In a second aspect the invention may provide a system for producing components by layerwise consolidation of powder comprising an additive manufacturing apparatus as defined above and a laser. The laser of the system is coupleable to the optical module such that a laser beam produced by the laser can be steered into the processing chamber of the apparatus.

Advantageously, this aspect of the invention allows for a system comprising a plurality of lasers having different wavelengths and a corresponding plurality of removably mountable optical modules for the laser processing apparatus. Each of the optical modules contains optical components that are set up specifically for use with a specific laser or lasers, for example a sub-set of lasers within a particular range of wavelength or a particular range of power.

Some materials can be processed more efficiently by use of lasers with different wavelength or power. For example, the same wavelength and power would not be appropriate for melting copper and steel and plastic materials. In order to maintain flexibility as to what materials can be manufactured in a particular apparatus the invention advantageously allows for quick change of laser and optical modules.

Examples of parameters that may be different within different modules for use with different lasers include optical materials or optical coating materials for use with different wavelengths of laser light, focal or beam expansion settings for use in processing different types of material, or optical materials and/or heat removal means for use with lasers of different powers. Thus, a single laser manufacturing apparatus can be swiftly changed from using, for example, a fibre laser operating with a wavelength of 523 nanometers to a carbon dioxide laser operating with a wavelength of 1.6 micrometers. This change can be swiftly accomplished by technicians of low skill replacing a laser and an optical module on the apparatus.

The optical module may comprise an integral means for allowing the optical components to pitch/or and roll in relation to the processing chamber. Alternatively, a system according to this aspect of the invention may further comprise a connector for mounting the optical module to the processing chamber of the apparatus. Such a connector would be capable of movement allowing the mounted optical module to pitch and/or roll in order to adjust beam alignment through the processing chamber window.

In a third aspect the invention may provide a method of preparing a laser processing apparatus for operation. The method comprises the steps of aligning optical components for focusing and steering a laser beam within a housing of a removable optical module, hermetically sealing the housing of the module to maintain and control atmosphere within the module and mounting the module to a processing chamber of the laser processing apparatus such that a laser beam steered by the module can be used in a laser processing operation. As described above, this remote alignment of optical components has a number of advantages over the existing method of preparing laser processing apparatus involving the alignment and set up of components in situ on the chassis of a laser processing apparatus.

Preferably the optical components are aligned in a controlled environment, for example a clean room. Optionally the set up may involve the step of forming an inert gas atmosphere within the module, for example by purging the interior of the module with an inert gas such as helium, nitrogen or argon. The atmosphere within the module may be at a low pressure compared with atmosphere for example a partial vacuum.

Advantageously the setup of an optical module remote to the machine allows the optical set-up to be tested and validated or certified at a remote location to the laser processing apparatus. The performance of the optical module may advantageously be continually monitored either on site or remotely by means of sensors mounted within the module. This allows the performance of the module to be constantly assessed such that when the performance falls below a level required by a particular level of validation or certification or below a level required for optimal performance of a particular process the module can be serviced or replaced.

It is advantageous that the data generated by sensors within the optical module may be monitored from a remote location, for example, from the facility responsible for set up and servicing of the optical module. This data can be monitored remotely, for example by use of network or internet connections and protocols.

Advantageously, a replacement module may be ordered or automatically ordered when monitored data generated by sensors within the optical module indicate that the performance of the module is below a predetermined level.

A further aspect of the invention provides an apparatus for producing components by layerwise consolidation of powder using a laser beam comprising a build chamber for forming the component and a window through a wall of the build chamber allowing a laser beam access to a build surface within the build chamber, in which the pressure at the build surface can be lowered to $10^{-4}$ Torr or less.

The potential advantages arising from producing a component at low pressure have been discussed above. Preferably the window of the build chamber comprises a layer of material that is transparent to the wavelength of light generated by a particular laser used for a particular process, the material being at least 50 mm thick. The use of and potential materials for sealing the window in the build chamber have been discussed above.

In a still further aspect the invention may provide an optical module suitable for delivering a laser beam to a manufacturing apparatus, in particular to an additive manufacturing apparatus. The module may comprise a sealable housing, for example a hermetically sealable housing containing optical components for focussing and steering the laser beam. The housing is adapted to be removably mountable to the manufacturing apparatus such that the laser beam can be used in a manufacturing process within the manufacturing apparatus. Further preferred and advantageous features of the optical module may be the same as described above in relation to the first aspect of the invention.

Preferred aspects of the invention will now be described in detail with reference to the drawings in which.

Figure 1:
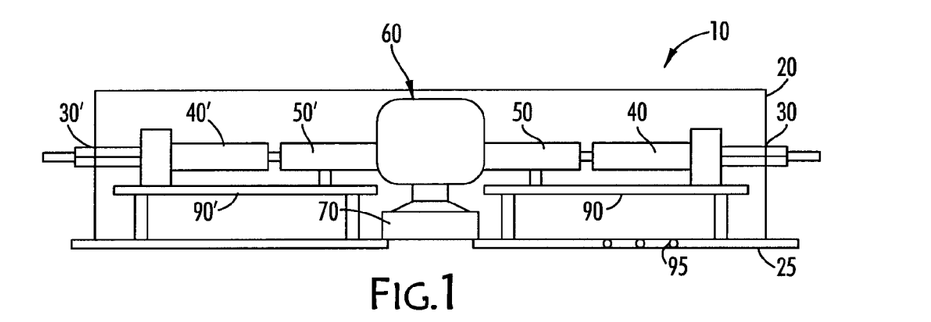
FIG. 1 illustrates a schematic cutaway of an optical module showing some of the optical components contained therein.

FIG. 1 shows an optical module 10 for delivering a laser beam to a manufacturing apparatus. The module comprises a hermetically sealable housing 20 including a rigid base plate 25. The housing, including the rigid base plate 25, provides a rigid chassis that substantially reduces or eliminates distortions during use. Even minor distortions to the chassis could compromise the sensitive alignment of components within the module.

An interface 30 through the housing couples to a fibre optic cable to deliver a laser beam to the module from a laser source.

The laser source could be any suitable laser source for example a yttrium aluminium garnet (YAG) laser source or a diode laser or a disk laser. Lasers having longer wavelengths such as, for example, a $CO_2$ laser may also be used with suitable modification to the interface supplying the laser into the housing (longer wavelength lasers are not usually supplied via a fibre optic cable).

The laser source will be primarily selected according to the wavelength of the laser and the power produced by the laser source. A preferable laser source is a ytterbium fibre laser, typically having a power up to 400 watts for example 50 watts or 100 watts or 200 watts. Preferably the laser source will supply a collimated output beam via optical fibre cable to the optical fibre interface 30 of the optical module 10.

The purpose of the optical module is to take the beam produced by the laser source, configure the beam to the required characteristics, and deliver it to a work-piece. In a preferred example (as schematically illustrated in FIG. 1) the delivery path or optical path of the laser beam includes a beam expander 40, a varioscan module 50, a galvanometer scanning head 60 and a flat field objective (f-theta lens) 70.

As is also schematically illustrated in FIG. 1 a second delivery path or optical path of the laser beam includes a second beam expander 40', a second varioscan module 50', to direct laser beams into processing chamber 120. Such second delivery path would also have its own scanning head and f-theta lens housed with the first delivery path.

Varioscan is a trade name for an optical component that combines a beam expander and a telescope. The varioscan module operates in conjunction with the galvanometer scanning head to provide continual adjustment to image size, working distance and spot size of the laser beam, as required. For a preferred optical module accepting a laser output power of 200 watts the varioscan module allows spot size variation of between 50 micrometers and 500 micrometers to a processing area of 250 $mm^2$.

The varioscan module and the beam expander are mounted on a linear rail 90 within the housing. The rail is preferably made from a material such as Invar to reduce the effect of thermal distortion of the rail on the alignment of the optical components.

Figure 2:
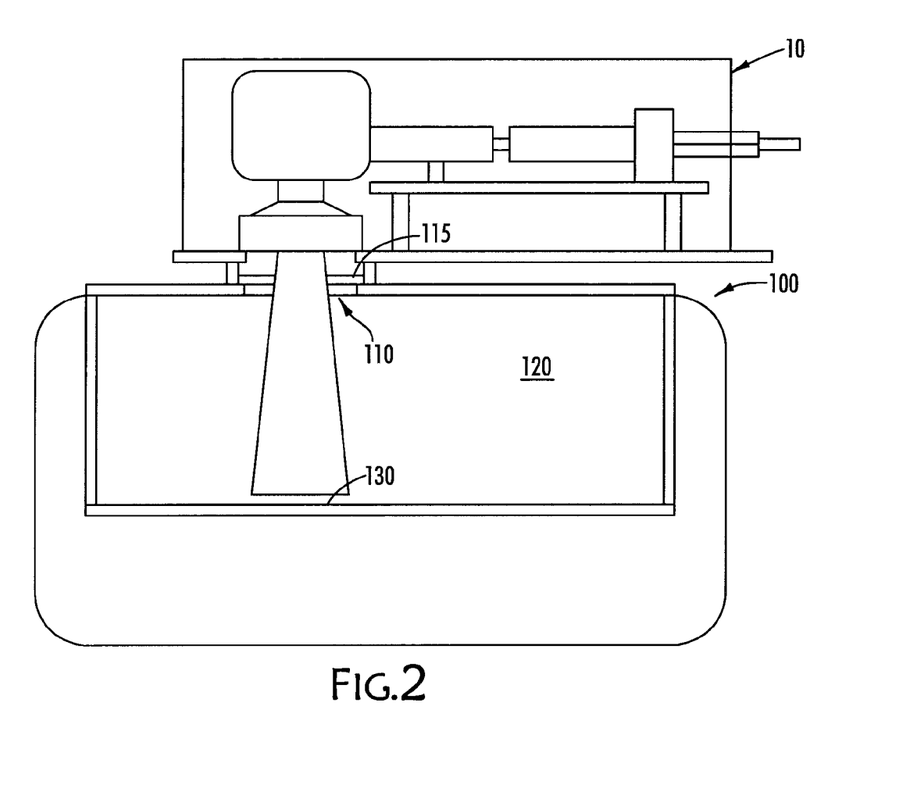
FIG. 2 is a schematic illustration of the optical module illustrated in FIG. 1 mounted as part of a laser processing apparatus to direct a laser beam into the processing chamber of the laser processing apparatus.

FIG. 2 illustrates the optical module of FIG. 1 10 mounted to and forming part of a laser manufacturing apparatus 100, such that a laser beam delivered by the optical module can be delivered through a window 110 of a processing chamber of the apparatus 120. The laser beam is delivered to a work surface of the apparatus 130.

The window of the processing chamber is sealed by a 15 mm thick quartz plate 115 that is transparent to laser light of the selected laser beam. The quartz plate 115 is coated on both sides for optimum optical performance.

The processing chamber is constructed such that it can operate at low pressure, for example a pressure of $1 \times 10^{-4}$ tool or less.

In addition to the interface 30 for allowing access to a laser beam from a laser source, the housing 20 of the module includes couplings and ports for water cooling channels 95, communication cables and power supply cables (not shown). Communications ports on the outer surface of the housing allow connection to and communication between a computer or control module and optical components including the galvanometer scanner and the varioscan unit.

Figure 3:
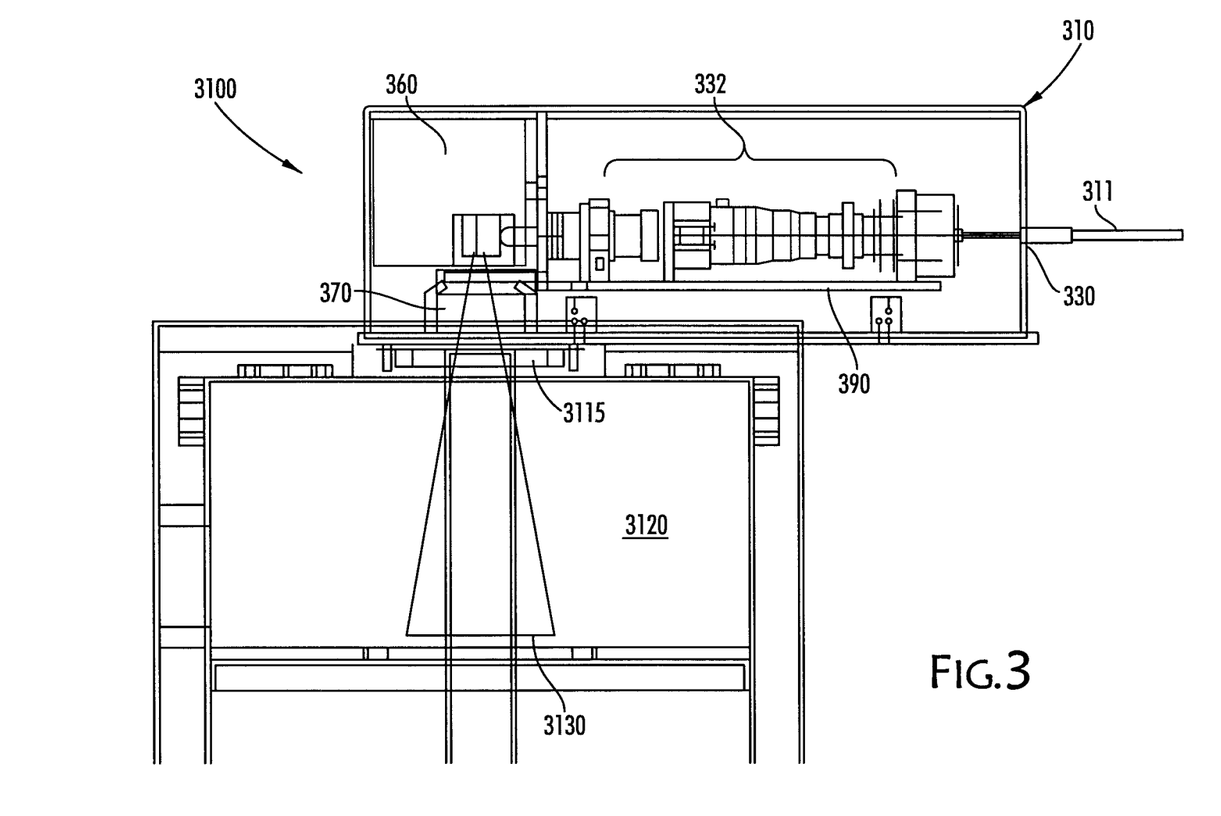
FIG. 3 illustrates a cutaway view of an optical module mounted as part of a SLM apparatus to direct a laser beam into the build chamber of the SLM apparatus.

FIG. 3 illustrates a selective laser melting (SLM) apparatus 3100 according to an aspect of the invention comprising an optical module 310 and a build chamber 3120. A laser beam from a fibre laser source is delivered to the module by a flexible ruggedised fibre optic cable 311 and into the optical module via optic fibre interface 330. The laser beam passes through a number of optical components 332 mounted on an invar linear rail 390 within the optical module. A galvanometer scanning mirror 360 delivers the laser beam through an f-theta lens 370 and a quartz window 3115 into the processing chamber 3120 or build chamber of the SLM apparatus 3100.

The laser beam can be scanned by the laser scanning mirrors 360 across the surface of an image field or build surface 3130. The build surface may be of any practical dimensions, for example 100 mm by 100 mm, or 265 mm×265 mm or 300 mm by 300 mm, or 500 mm by 500 mm.

Figure 4:
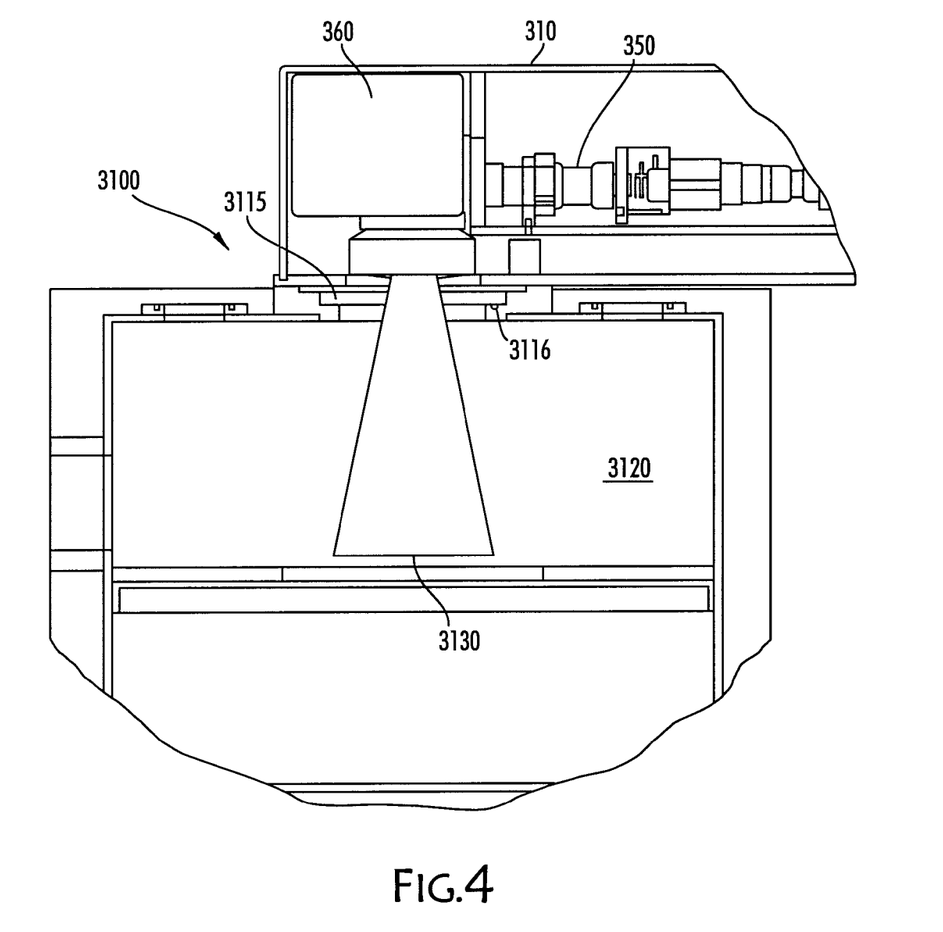
FIG. 4 illustrates a cutaway view of an optical module mounted as part of a SLM apparatus to direct a laser beam into the build chamber of the SLM apparatus.

FIG. 4 illustrates a cut-away portion of the SLM apparatus of FIG. 3. This illustration clearly shows the build surface 3130, the quartz covering to the window into the build chamber 3115, the galvanometer scanning head 360, a varioscan unit 350 and a beam expander 340. It can be seen that the quartz window 3115 is sealed to an upper portion of the processing chamber 3120 by a sealing means incorporating O-rings 3116.

Figure 5:
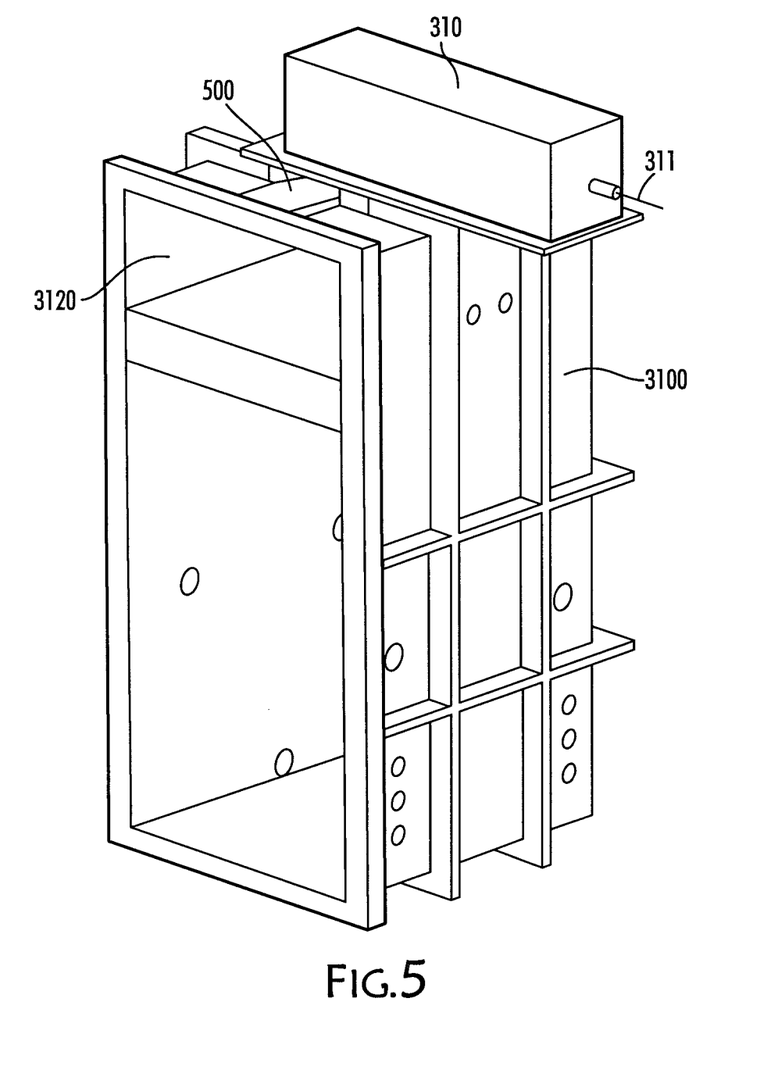
FIG. 5 illustrates a perspective view of an optical module as illustrated in FIG. 4 or 5 mounted onto and forming part of a SLM apparatus.

FIG. 5 illustrates a perspective view of the SLM apparatus of FIGS. 3 and 4. The optical module 310 is mounted to an upper portion of the build chamber 3120 via a mounting block 500 on an upper portion of the build chamber.

Figure 6:
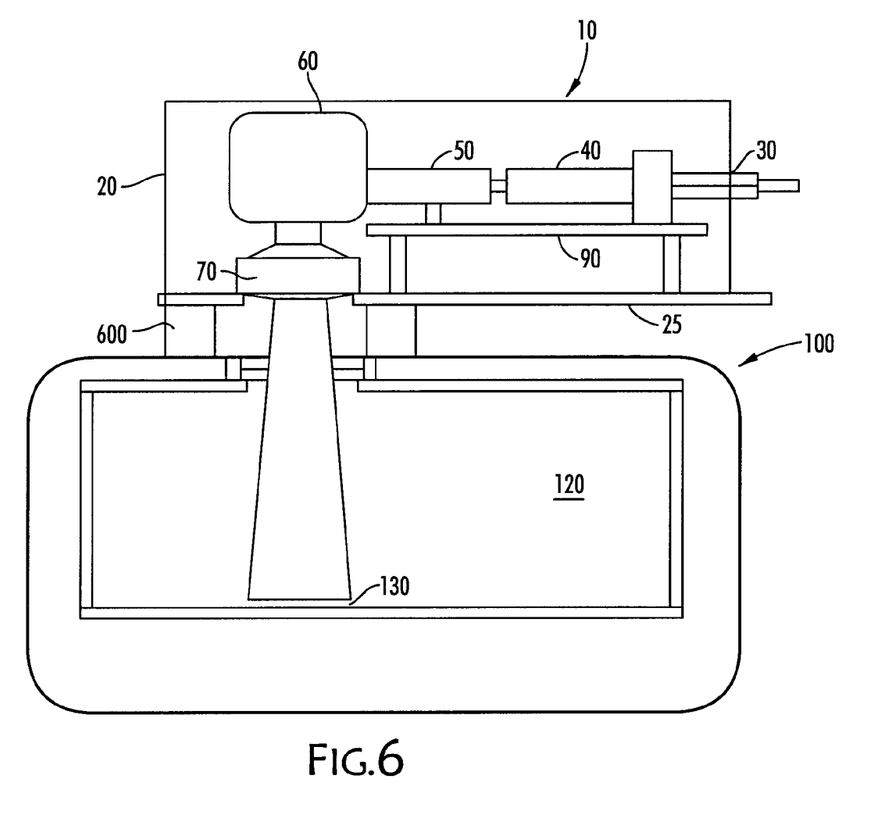
FIG. 6 illustrates a laser module embodying the invention mounted to direct a laser beam into the processing chamber of a laser processing apparatus with a separator component arranged between the optical module and the processing chamber.

FIG. 6 is a schematic illustration of a laser manufacturing apparatus 100 according to an aspect of the invention. The apparatus of FIG. 6 is similar to the apparatus of FIG. 2 and, for convenience, the same reference numerals are used for components that are common to both embodiments. Thus, the apparatus of FIG. 6 comprises an optical module 10 substantially as illustrated in FIG. 2 and described in the text accompanying FIG. 2. The difference between the apparatus illustrated in FIG. 6 and that illustrated in FIG. 2 is that the optical module 10 is coupled to a processing chamber 120 of the apparatus 100 by means of a coupling member 600.

Coupling member 600 may simply be a spacing block that allows the optical module to be spaced a pre-determined unit distance above a build or processing surface 130 to provide optimum focus and scanning parameters.

The coupling member 600 may also allow vertical movement of the optical module with respect to the processing chamber so that the working height of the module can be varied. The coupling member 600 may also be adjustable so as to allow some pitch and/or roll of the optical module to position the laser beam optimally for carrying out a manufacturing process.

A preferred module according to any aspect of the invention also contains thermometers or thermosensors to measure the temperature at different locations within the module and an atmospheric sensor to monitor atmospheric conditions within the module. The housing includes external communication ports allowing communication between the sensors and a computer or control module.

In the specific embodiments described above, the communications between various optical components and sensors within the optical module are achieved in this embodiment by means of umbilical connection, i.e. a physical cable connection between a computer and the module. It is clear, however, that wireless technology allows control of various components, or the reporting of data from a sensor, to be achieved by wireless means using one of a number of wireless communication protocols.

When the optical module according to an aspect of the invention is set up for use with a laser source, optical components are selected to be compatible with the specific wavelength, or range of wavelengths, produced by the laser source and the power of the laser. These components are then, in a preferred module, mounted to a fixed rail and carefully space oriented and aligned. The components are tested and the optical module is sealed. In a preferred method of setting up the optical module, the set up process is performed in a clean room having a dehumidified dust-free atmosphere. Thus, when the module is sealed, the atmosphere inside the module is a dehumidified dust-free air atmosphere. Because the sealing of the module produces a hermetic seal, this atmosphere is maintained within the module.

The module is then delivered to a manufacturing site having a manufacturing apparatus, and the module housing or chassis simply needs to be mounted to a laser manufacturing apparatus. As the optical components of the module have been aligned and tested, the module only needs to be mounted to the apparatus and the various power and communications connections to be attached. Effectively the module should be "plug and play", and not require the services of a skilled technician to mount to a laser processing apparatus.

In a preferred system, the optical module is controlled by software on a computer. Sensors within the module monitor various parameters, such as temperature and beam profile and quality, and this data is transmitted to the computer. Data relating to the module's performance is then transmitted via the Internet to a central server where details of the module's performance are compared with minimum performance values. If the module performance falls below a pre-determined level, a new module can be ordered and shipped, or the module can be recalled for servicing.

The invention claimed is:

1. An additive manufacturing apparatus comprising:
a processing chamber containing a planar build surface;
a plurality of lasers for generating laser beams having different properties;
an optical system for independently steering each one of a plurality of laser beams to direct a spot of the laser beam to the planar build surface and having an optical module with a plurality of optical trains, each optical train delivering one of said plurality of laser beams to the planar build surface.

2. An additive manufacturing apparatus according to claim 1, wherein the different property is wavelength of the laser beam.

3. An additive manufacturing apparatus according to claim 1, wherein the different property is power of the laser beam.

4. An additive manufacturing apparatus according to claim 1, wherein the optical system comprises different set ups of optical components for steering each laser beam.

5. An additive manufacturing apparatus according to claim 4, wherein the different optical set ups comprise optical components of different optical materials or different optical coating materials suitable for the properties of the laser beam.

6. An additive manufacturing apparatus comprising a processing chamber, a plurality of lasers for generating a plurality of laser beams and an optical module comprising a housing containing a plurality of optical trains for delivering the plurality of laser beams into the processing chamber simultaneously.

7. An additive manufacturing apparatus according to claim 6, wherein each optical train of the plurality of optical trains has an identical set-up of optical components to allow for the delivery of multiple identical laser beams to the processing chamber.

8. An additive manufacturing apparatus comprising a processing chamber and an optical module for delivering a laser beam into the processing chamber, the optical module comprising a housing, the housing containing optical components for focussing and steering the laser beam, wherein walls of the housing define cooling channels for carrying cooling fluid for cooling the module.

\* \* \* \* \*